Nov. 16, 1926.  1,607,393
J. H. DERBY
ELECTRIC LIQUID HEATING APPARATUS
Filed Jan. 9, 1925   2 Sheets-Sheet 1

INVENTOR
John H. Derby
BY
ATTORNEYS

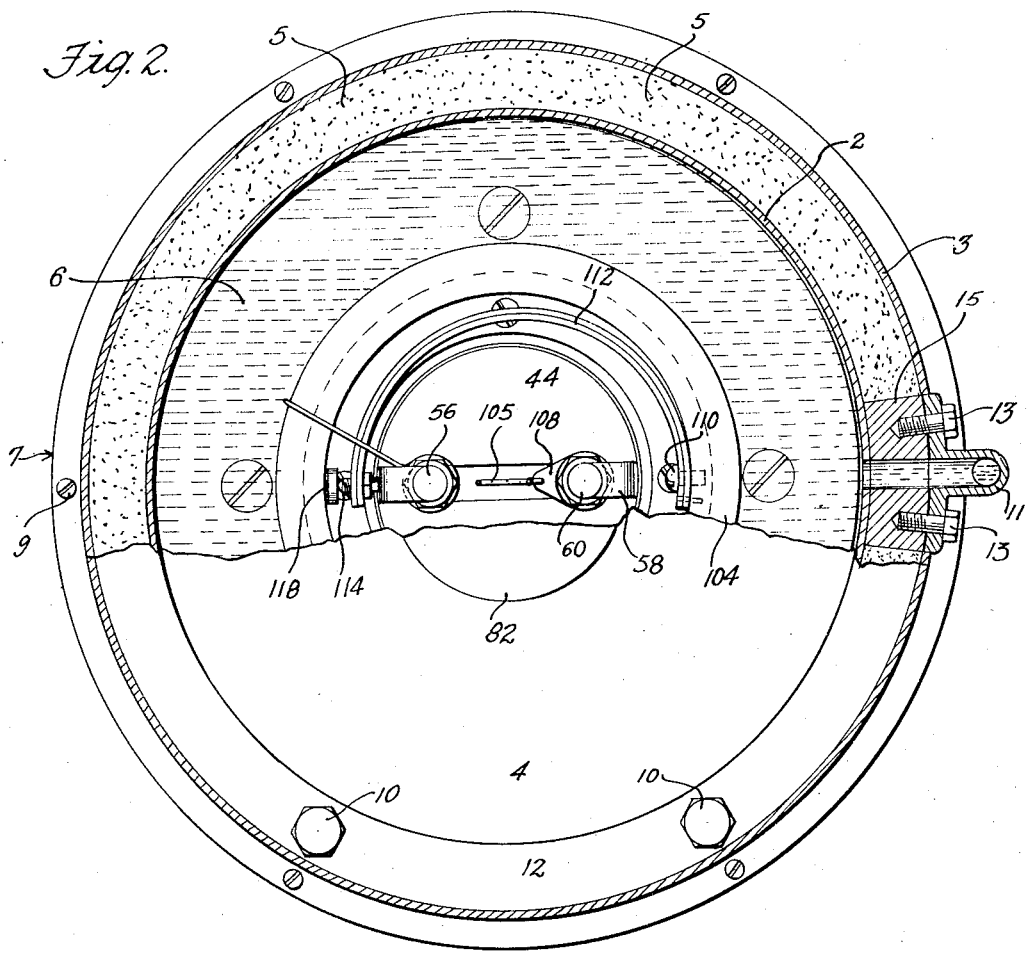

Patented Nov. 16, 1926.

1,607,393

UNITED STATES PATENT OFFICE.

JOHN H. DERBY, OF NEW YORK, N. Y.

ELECTRIC LIQUID-HEATING APPARATUS.

Application filed January 9, 1925. Serial No. 1,398.

This invention relates to electrical heating means and particularly to means for heating water or other liquids or fluids electrically, and it has for its general object the provision of simple, economical and yet efficient means for maintaining a conveniently available supply of water sufficiently heated and in quantity adequate to meet the ordinary incidental demands for hot water.

A more particular object of the invention is to provide a compact but highly efficient heating device which may be attached, for example, to water piping in place of the usual faucet and which may have its heating element or elements plugged into the usual electric outlet without special provision in the way of wiring or fuses and which when thus connected will supply, upon demand, water heated to the desired temperature and in sufficient quantities for ordinary use.

Another object of the invention is to provide electrical water heating apparatus which will be self-governing so that the current supplied to the apparatus to be converted into heat units will flow only when heat is needed to bring the water, or the heat storage medium through which heat is transferred to the water, to the desired predetermined temperature.

As above suggested, the invention is preferably embodied in apparatus of the type in which the heat is transferred to the water through a heat storage medium in which the electrical heating unit or units is or are situated, such heat storage medium being preferably in the form of a liquid, and a further object of the invention is so to design and control the operation of the apparatus that the heat in the heat storage medium will be sufficient in amount and may be so rapidly transferred to water flowing through the apparatus, in addition to the water normally stored therein, that a considerable supply of hot water may be furnished from heating apparatus of comparatively very small bulk.

The invention aims both to utilize the expansion and contraction of the heat storage medium to govern the supply of current to the heating element or elements, and also to utilize this heat storage medium to prevent arcing or excessive heating or burning of the contacts when breaking the current supply circuit.

The invention also aims to provide automatic electrical water heating apparatus, for the purposes set forth, in which provision is made for automatically venting air or other gas which may accumulate in the storage chamber regardless of the length of the interval between successive demands upon the apparatus.

An important feature of the invention is the provision of means for governing the supply of current to the heating element arranged to operate only when the expansion of the heat storage medium has reached a predetermined point, and also so arranged that its operation shall be in the nature of a quick snap action thereby tending to prevent the formation of an arc at the point where the circuit is broken, this feature being preferably combined with an arrangement whereby the circuit is broken within the liquid heat storage medium itself, thus effectually quenching any arc which might tend to form.

A further important feature of the invention is the provision of means for automatically providing a compensating flow of current through the heating element to compensate for slight losses of heat due to radiation, this means being preferably arranged to operate in such manner as to take care of heat losses which occur at other times than when water is being drawn, thereby avoiding the necessity for frequent operation of the automatic governing means through which the full current is turned on and off the heating element.

Other objects and important features of the invention will appear from the following description and claims when considered in connection with the accompanying drawings, in which—

Fig. 2 is a section of the heater above the diaphragm shown in Fig. 1, the diaphragm being partly broken away to show the structure below it; and Fig. 3 is a section through the heating unit.

Figure 1:
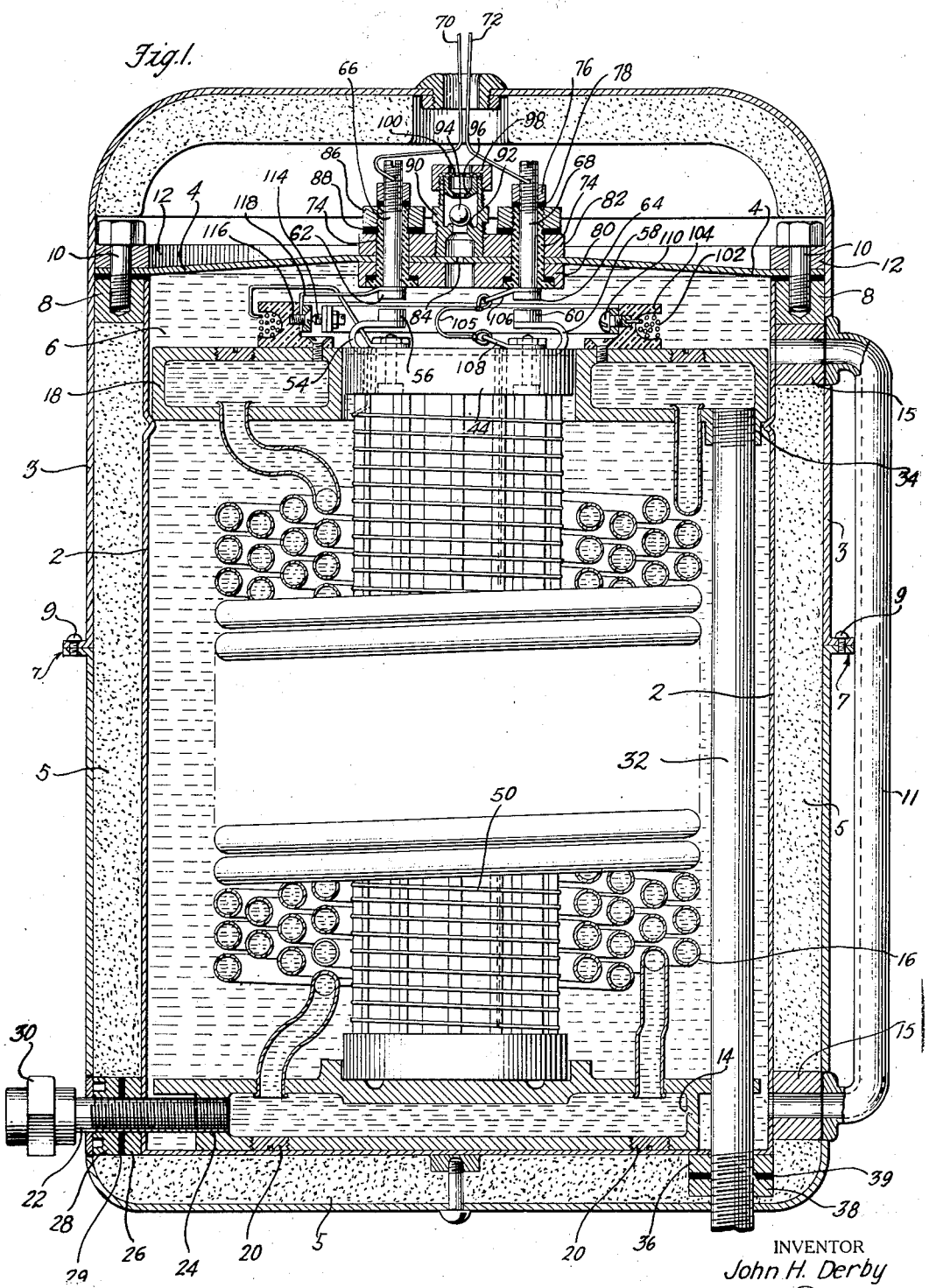
Fig. 1 is a vertical section through an electrical water heater embodying the present invention in one of its preferred forms.

As hereinabove suggested, the invention is embodied in heating apparatus in which the heat is preferably transferred to the water through a heat storage medium and not directly from the electrical heating units to the water. By such use of a heat storage medium and by proper selection of this medium many important advantages are obtained, particularly in the way of automatic control, compactness, and elimination of danger from and wear of the electrical elements of the automatic control.

The illustrated embodiment of the invention is intended for attachment directly to the water piping of a house or office where it is desired to provide substantially instantaneous hot water in quantities not too great at one time, and comprises a cylindrical casing 2 which has its upper end closed by a diaphragm 4, the chamber 6 thus formed within the casing being filled with the heat storage medium used in the apparatus, this medium, in the illustrated embodiment of the invention, being preferably oil having a high flash point, such as transformer oil or castor oil.

This casing 2 is surrounded by an outer jacket 3 in such a manner as to provide an intervening space which is filled with a suitable heat insulating material 5. In order that the interior of the apparatus may be readily accessible, the outer jacket is divided as at 7 to provide two sections secured together as at 9.

A free circulation from end to end of the chamber 6, is obtained by the provision of a pipe 11. This pipe 11 is secured in position by means of cap screws or the like 13 which engage threaded recesses in blocks 15, suitably secured to the outer face of the casing 2. It will, of course, be understood that when the sections of the jacket are removed, one end of this pipe 11 will necessarily have to be disconnected with its respective block 15.

The diaphragm 4, which is normally somewhat cupped as shown in the drawings, is clamped to the casing 2 in any suitable manner so that its edges are confined against movement either in their own plane or in directions transverse to said plane, the illustrated means for clamping the edges of the diaphragm comprising blocks 8 preferably spot welded or otherwise permanently secured to the outer wall of the casing 2 and tapped to receive cap screws 10 by which a ring 12, resting against the upper face of the diaphragm 4 around its outer margin, is clamped down against the upper edge of the casing 2, the blocks 8 having their upper edges preferably slightly below the upper edge of the casing 2 so that the clamping engagement is directly between the ring 12 and the upper edge of the casing 2.

The cupping of the diaphragm 4 is not carried beyond a point where it will prevent the flexing of the diaphragm between inwardly and outwardly cupped positions. By making the diaphragm of a metal of considerable resiliency, such, for example, as phosphor-bronze, the movement between its inwardly and outwardly cupped positions will be comparatively rapid when the pressure in the appropriate direction has reached a point where it overcomes the resistance of the diaphragm to movement into its other cupped position. In fact, the diaphragm will snap from one position to the other, a characteristic of its operation which is utilized to obtain an important advantage in the automatic control of the apparatus, as hereinafter set forth.

The water to be heated is introduced into the apparatus near the bottom thereof and is carried through coils, which are surrounded by the heat storage medium, to a point near the upper end of the apparatus and is there collected in a manifold and preferably carried again to a point near the bottom of the apparatus for discharge. In the illustrated construction there is a manifold 14 resting upon the bottom of the chamber 6 in the casing 2, from which manifold coils 16 extend through the oil or other heat storage medium in its chamber 6 to a second manifold 18 near the upper end of the chamber, these coils having their ends preferably expanded upon the inside of the manifolds, openings closed by screws 20 being provided opposite the end of each coil terminal through which the expanding tool may be inserted.

The water is led into the lower manifold 14 through a pipe 22 screwed into an opening 24 tapped into the manifold 14, and also into a block 26 welded upon the casing 2 and is locked in position by a nut 28 between which and the block 26 a suitable oil tight packing washer 29 is clamped. A union 30 is provided for connection to the water piping.

The upper manifold 18 discharges its water through a pipe 32 preferably carried down through the chamber 6 and through the bottom of the casing 2, the pipe 32 being screwed into an opening 34 in the manifold 18, and into a block 36 welded upon the casing 2, and is secured by a nut 38 pressing against a packing washer 39. Any suitable faucet (not shown) may be screwed upon the lower end of the pipe 32, the faucet preferably having therein an adjustable cone to control flow of the outgoing water, this faucet being preferably of the type shown in my copending application Serial No. 528,423, filed January 11, 1922, which may be adjusted to control the flow without varying the apparent size of the stream.

The electrical heating unit is preferably located in the center of the chamber 6 and rests upon the upper side of the lower manifold 14. The unit preferably comprises a porcelain spool 44 resting upon the upper face of the manifold 14 and centered thereon by an annular rib 46 formed integral with said manifold.

The porcelain spool 44 has the usual flanges at its end, and extending between these are vertical ribs 47 between which the spool is cut away, as shown at 48, to provide circulating openings through which the oil or other heat storage medium can circulate through the interior of the spool.

The resistance wire 50, which may be of any of the well-known electrical heating alloys, is wound spirally about the spool, the wire resting upon the vertical ribs 47, thus permitting the oil to circulate up and down the spool between the ribs and over the wire.

One end of wire 50 is shown as connected to a spring member 54 carrying one of the contact members 56 of a circuit breaking switch and the other end of wire 50 is shown as connected to the spring member 58 also carrying a contact member 60 of the circuit breaking switch, the other contact members 62 and 64 of this switch being constituted by the heads of screws 66 and 68 to which the wires 70 and 72 leading out of the apparatus are connected at their upper ends. The screws 66 and 68 extend through insulating tubes 74 and are clamped in position in these tubes by nuts 76, washers 78 of some suitable oil packing being clamped between the nuts 76 and the upper ends of the tubes 74. The tubes 74, in addition to passing through the diaphragm 4, preferably pass through two rings 80 and 82 of some suitable material such, for example, as Bakelite, which rings surround the vent opening 84 in the diaphragm 4 and are clamped in position by nuts 86 screwed upon the threaded exterior of said tubes, packing washers 88 being also preferably provided between the nuts 86 and the rings 82.

The novel vent mechanism provided to prevent accumulation of gas or vapor between the diaphragm 4 and the heat storage medium in the chamber 6 will now be described: This vent mechanism is contained in a nipple 90 screwed into the opening in the ring 82, the nipple 90 having preferably formed integral with it on its inside a valve seat 92 upon which rests a valve 94 in the form of a light ball which will float on the liquid heat storage medium in the chamber 6 when this liquid enters the compartment between the nipple above the valve seat, various constructions of balls for this purpose being available such, for example, as a hollow papier-mâché ball coated with copper. An upper valve seat 96 is also provided for the valve 94, this seat being preferably formed on a member that can be screwed into and out of the upper end of the nipple 90 so that it is readily removable to permit the insertion or removal of the valve 94. Clamped between the upper end of the nipple 90 and a centrally perforated cap 98 is a screen 100 to prevent the entry of foreign matter into the valve chamber.

The operation of the valve in the vent will readily be understood from the foregoing description. When the liquid in the chamber 6 expands, a portion of it will pass up through the opening 84 and float the valve 94 away from its seat 92 thus driving ahead of it and causing any vapor or gas to vent from the chamber below the diaphragm 4. Continued expansion of the liquid will bring the valve 94 against its upper seat 96, thus closing the vent whereupon still further expansion of the liquid will necessarily move the diaphragm 4 from its inwardly cupped position to its outwardly cupped position. When the apparatus cools off and the liquid in the chamber 6 begins to contract, the valve 94 will float down with the receding liquid until it rests against its seat 92, when the further contraction of the liquid in the chamber 6 will cause a vacuum to be formed under the valve 94 and under the diaphragm 4, which, when it extends over a sufficient part of the inner surface of the diaphragm, will cause the diaphragm to be cupped inwardly under the action of atmospheric pressure.

To avoid the necessity for frequent operation of the main circuit-breaking switch in order to maintain the temperature of the heat storage medium when water is not being drawn through the apparatus, there is preferably provided auxiliary means for controlling a small flow of current through the heating unit when the main switch is broken, whereby any losses of heat due to radiation may be made up.

In the illustrated embodiment of the invention, a comparatively high resistance wire 102 wound on a small spool 104 resting on the upper manifold 18, and preferably attached thereto, is placed in series with the resistance wire 50, the connections comprising, as shown in Fig. 1 in the open condition of the main circuit breaker, a short flexible wire 105 connecting a spring strip 106 under the head of the screw 68 with a spring strip 108 clamped against the spring member 58, which, as above set forth, is connected with one end of the wire 50, the other end being connected to the spring strip 54 against which is clamped a loop in one end of the resistance wire 102. The other end of the resistance wire 102 is connected to a screw 110, which serves to clamp one end of the thermostatic couple 112 against the inside of the spool 104, the other end of the thermostatic couple carrying an adjustable contact 114 adapted to engage the head of the screw 116 which serves to clamp against the inner face of the spool a conductor 118 having its other end clamped under the head of the screw 66.

It will be noted that these connections are so arranged that when the contacts 56 and 60 of the main circuit breaker are engaged respectively by the contacts 62 and 64, the resistance wire 102 will be short-circuited and the current will flow directly through the resistance wire 50 without passing through the wire 102. When, however, the parts are in the position shown in Fig. 1 of the drawings, the current must pass through resistance 102 as well as resistance 50, and will thus be cut down to a flow that will be sufficient only to make up the losses of heat due to ordinary radiation.

If the heater be located where such losses are comparatively small, or if changes in the outside temperature tend to cause the radiation of heat to be less than the heat supplied when the parts are in the position shown in Fig. 1, the thermostatic couple 112 will break the circuit by moving the contact 114 away from the contact 116, thus preventing any flow of current through the heating unit.

What is claimed as new is:

1. In apparatus of the class described, an electric heating element, a liquid heat storage medium in which said heating element is immersed, a circuit breaker also immersed in said heat storage medium for breaking the circuit through said heating element, and means controlled by the expansion and contraction of said storage medium for snapping said circuit breaker into and out of operative condition.

2. In apparatus of the class described, an electric heating element, a liquid heat storage medium in which said heating element is immersed, circuit making-and-breaking means in the circuit through said heating element and also immersed in said heat storage medium, a member arranged to snap from one to the other of two positions when tensioned by a predetermined pressure in the appropriate direction due to expansion or contraction of the heat storage medium, and a connection between said member and an element of said circuit making-and-breaking means, whereby the movement of said member opens or closes said circuit for a predetermined expansion or contraction of the heat storage medium.

3. In apparatus of the class described, an electric heating element, a liquid heat storage medium in which said element is immersed, a second electric heating element of higher resistance also immersed in said heat storage medium, an electric circuit including said first-mentioned heating element and comprising a shunt through said second-mentioned heating element, circuit making-and-breaking means in said circuit arranged to short-circuit, but not to open, said shunt, and means operable by the contraction and by the expansion of said heat storage medium for operating said circuit making-and-breaking means.

4. In apparatus of the class described, an electric heating element, a liquid heat storage medium in which said heating element is immersed, a circuit breaker also immersed in said heat storage medium for breaking the circuit through said heating element, and means for operating said circuit breaker to open and to close said circuit in accordance with the expansion and the contraction of said heat storage medium, comprising a member arranged to snap under critical pressure from one to the other of two positions of stability.

5. An electric water heater comprising, in combination, an electric resistance element operating to convert electric current into heat, a liquid heat storage medium in which said electric resistance element is immersed, a water conduit arranged to expose a relatively large surface of the water therein to the heat transferring action of said heat storage medium, a chamber for said heat storage medium having one wall constituted by a resilient cupped diaphram adapted to snap under pressure in the appropriate direction from one side to the other of the plane of its edges, and a circuit breaker in the electric circuit through said resistance element, said breaker having one member connected to said diaphragm, whereby a predetermined expansion of said heating medium snaps said breaker into open condition and a predetermined contraction of said medium snaps it into closed condition.

6. In apparatus of the class described, an electric heating element, a liquid heat storage medium in which said heating element is immersed, a chamber for said heat storage medium having as one wall thereof a diaphragm movable outward by the liquid pressure as said liquid expands and movable inward under atmospheric pressure as said liquid contracts, and a circuit breaker having one member connected to and operated by said diaphragm to break and to restore the circuit through said heating element, said circuit breaker being also immersed in said heat storage medium.

7. In apparatus of the class described, an electric heating element, a liquid heat storage medium in which said heating element is immersed, a chamber having as one wall thereof a diaphragm movable outward under liquid pressure and inward under atmospheric pressure in accordance with variations in the heat of said storage medium, and an air vent in said diaphragm comprising a two seated valve operating to close said vent after a predetermined expansion of said liquid and also again to close said vent after a predetermined contraction of said liquid.

8. In apparatus of the class described, an electric heating element having in circuit therewith a high resistance element for cutting down the current flow through said heating element, a liquid heat storage medium in which both of said elements are immersed, means for normally short-circuiting said high resistance element, means governed by the expansion of the liquid for breaking said short-circuiting connection, and thermostatic means for interrupting the current flow through both of the aforementioned elements when the temperature of said heat storage medium reaches a predetermined point.

9. In apparatus of the class described, an electric heating element, connections to a source of electric current supply, a heat storing medium in heat receiving relation with said electric heating element, and means for controlling the volume of electric current supplied to said electric heating element, said means comprising a resistance adapted to be cut into or out of the circuit of said electric heating element by variations in the temperature of the heat storing medium.

10. In apparatus of the class described, a heat storing medium, an electric heater therefor, connections to a source of electric current supply for said heater, a resistance element adapted to be cut into said source of electric current supply to reduce the current delivered to the electric heating element, said resistance element being controlled by the action of the electric heating element upon the heat storing medium, and thermostatic means operable by the temperature of the heat storing medium for interrupting the flow of current to the electric heating element, and the resistance element.

11. In apparatus of the class described, a heat storing medium, an electric heating element, connections to a source of electric current supply for said electric heating element, a resistance element normally in circuit with said electric heating element, and means operated by a fall in temperature of the heat storing element for cutting said resistance element out of circuit with the electric heating element.

12. In apparatus of the class described, a heat storing medium, an electric heating element for supplying heat to the heat storing medium, connections to a source of electric current supply for said electric heater, a resistance element in said source of electric current supply and normally in series with said electic heating element, and means for short-circuiting said resistance element upon predetermined fall of temperature in the heat storing element.

13. In apparatus of the class described, a heat storing medium, an electric heating element for supplying heat thereto, connections to a source of electric current supply for said electric heater, a resistance element in said source of electric current supply, and normally in series with said electric heating element, means for short-circuiting said resistance element upon a predetermined fall of temperature in the heat storing element, and thermostatic means for interrupting the electric current supply upon a predetermined rise of temperature in the heat storing medium.

14. In apparatus of the class described, a heat storing medium, an electric heating element for supplying heat thereto, connections to a source of electric current supply for said electric heating element, a resistance element in said connections to the source of electric current supply, and normally in series with said electric heating element, means for short circuiting said resistance element upon a predetermined fall of temperature in the heat storing element, and thermostatic means independent of the resistance element controlling means for interrupting the electric current supply upon a predetermined rise of temperature in the heat storing medium.

15. In apparatus of the class described, a heat storing medium, a plurality of electric heaters of different heating capacities associated in heat transferring relation with said heat storing medium, said electric heaters under normal operating conditions being arranged in series with each other, connections to a source of electric current supply for said electric heaters, and means for short circuiting the electric heater of lesser heating capacity, and supplying the electric heater of greater heating capacity with all of the current of said electric current supply, said means becoming operative upon a fall in temperature in the heat storing medium.

16. In an apparatus for heating water, a liquid heat storing medium, means for circulating the water to be heated in the presence of said heat storing medium, a plurality of electric heating elements in heat transferring relation to said heat storing medium, means controlled by the temperature of the heat storing medium for cuting out one of said electric heating elements, and separate means also controlled by the temperature of the heat storing medium for cutting out both of said electric heaters.

17. In an apparatus for heating water, a liquid heat storing medium, means for circulating the water to be heated in the presence of said heat storing medium, a plurality of electric heating elements in heat transferring relation to said heat storing medium, means controlled by the temperature of the heat storing medium for cutting out one of said electric heating elements, and separate means also controlled by the temperature of the heat storing medium for cutting out both of said electric heaters, said electric heaters and said second mentioned controlling means being immersed in the liquid heat storing element.

18. In a water heater, a container, a heat storing medium in said container, a pair of water manifolds in said container, a water circulating coil establishing communication between said manifolds, said manifolds and water heating coil being immersed in the heat storing medium, an electric heating element occupying a position within the water circulating coil, and supported upon one of the manifolds, and a second electric heating element in series with the first mentioned heating element and supported on the other of said water circulating manifolds.

Signed at New York, N. Y., this 12th day of December, 1924.

JOHN H. DERBY.